(12) United States Patent
Evans et al.

(10) Patent No.: US 7,936,933 B2
(45) Date of Patent: May 3, 2011

(54) ACCELERATING VIDEO DATA DECODING

(75) Inventors: Glenn F. Evans, Kirkland, WA (US);
Shyam Sadhwani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1545 days.

(21) Appl. No.: 11/282,173

(22) Filed: Nov. 18, 2005

(65) Prior Publication Data
US 2007/0116128 A1 May 24, 2007

(51) Int. Cl.
*G06K 9/36* (2006.01)
*H04N 11/02* (2006.01)

(52) U.S. Cl. .................. 382/233; 375/240.25

(58) Field of Classification Search .......... 382/232–251; 375/240.02–240.29; 345/716
See application file for complete search history.

(56) References Cited

U.S. PATENT DOCUMENTS

| | | | |
|---|---|---|---|
| 5,831,688 | A | 11/1998 | Yamada et al. |
| 6,072,543 | A | 6/2000 | Kim |
| 6,081,295 | A | 6/2000 | Adolph et al. |
| 6,275,589 | B1 | 8/2001 | Spille |
| 6,295,319 | B1 | 9/2001 | Sueyoshi et al. |
| 6,344,808 | B1 | 2/2002 | Taruki et al. |
| 6,959,042 | B1 * | 10/2005 | Liu et al. ............... 375/240.02 |
| 6,959,116 | B2 * | 10/2005 | Sezer et al. ............... 382/251 |
| 2001/0046260 | A1 | 11/2001 | Molloy |
| 2002/0067369 | A1 * | 6/2002 | Sullivan .................. 345/716 |
| 2005/0174269 | A1 | 8/2005 | Sherigar et al. |

FOREIGN PATENT DOCUMENTS

| | | |
|---|---|---|
| EP | 0957639 | 11/1999 |
| WO | WO0203705 | 1/2002 |

OTHER PUBLICATIONS

Nadehara et al. ("Real-time software MPEG-1 video decoder design for low-cost, low-power applications," Workshop on VLSI Signal Processing, IX, 1996, IEEE, pp. 438-447, Published on Nov. 1, 1996.*

Froidevaux et al. "MPEG1 and MPEG2 system layer implementation trade-off between micro coded and FSM architecture," Proceedings of International Conference on Consumer Electronics, 1995, IEEE pp. 250-251, Published on Jun. 9, 1995.*

Froidevaux, M. et al., "MPEG1 and MPEG2 system layer implementation trade-off between microcoded and FSM architecture", in Proceedings of International Conference on Consumer Electronics, 1995, retrieved at <<http://ieeexplore.ieee.org/xpl/abs_free.jsp?arNumber=517974>>, printed Jan. 12, 2006, 3 page.

Kerkhof, et al., MPEG1 and MPEG2 Audio Coding Algorithms and Implementation, 1994 Conference on Consumer Electronics, 1994, retrieved at <<http://www.csa.com/partners/viewrecord.php?requester=gs&collection=TRD&recid=0151114CI&recid=0151114EA>>, pp. 236-237.

(Continued)

*Primary Examiner* — Duy M Dang
(74) *Attorney, Agent, or Firm* — Lee & Hayes, PLLC

(57) ABSTRACT

Accelerating video data decoding is described. In one aspect, hardware accelerated video decoding operations are configured to decode source video data in a first encoded data format. During video data processing operations, the source video data is evaluated to detect any change in the encoding format. Responsive to detecting a change in the source video data encoding, wherein the changed encoding is at least partially incompatible with the first encoded data format, the hardware accelerated video decoding operations are dynamically reconfigured. The reconfigured decoding operations decode the source video data content based on the changed encoded data format.

20 Claims, 4 Drawing Sheets

OTHER PUBLICATIONS

Kim, Seonjoo et al., "Real Time MPEG1 Audio Encoder and Decoder Implemented on a 16-bit Fixed Point DSP", pp. 900-904. available at <<http://www.mp3-tech.org/programmer/docs/211mfi.pdf>> as early as Feb. 6, 2005.

Nadehara, K. et al., "Real-time software MPEG-1 video decoder design for low-cost, low-power applications", VLSI Signal Processing, IX, 1996., [Workshop on] <<http://ieeexplore.ieee.org/xpl/abs_free.jsp?arNumber=558376>>, printed Jan. 12, 2006, 1 page.

* cited by examiner 200 (Cont'd)

ACCELERATING VIDEO DATA DECODING

BACKGROUND

To decode compressed video data, conventional video playback pipelines typically set the decoding algorithm based on the compressed data format of the data. For example, if MPEG-2 data is detected, existing systems and methods will typically select an MPEG-2 decoding algorithm. In another example, when MPEG-1 data is detected, conventional video playback pipelines will typically utilize an MPEG-1 software decoder to decode the video data. Because video decoding operations for one video data format are typically incompatible with video decoding operations of a different video data format, the level of hardware support and the particular video data format decoding algorithm initially selected by the video playback pipeline typically remains static for the video decoding session. However, some types of media, such as DVDs, include both MPEG-2 and MPEG-1 video data. This can be problematic. For example, when decoding operations configured to decode MPEG-2 data encounter MPEG-1 data, the decoding and video playback operations typically fail or otherwise result in erroneous decoded output (e.g., undesirable video artifacts).

SUMMARY

This Summary is provided to introduce a selection of concepts in a simplified form that are further described below in the detailed description. This Summary is not intended to identify key features or essential features of the claimed subject matter, nor is it intended to be used as an aid in determining the scope of the claimed subject matter.

In view of the above, accelerating video data decoding is described. In one aspect, hardware accelerated video decoding operations are configured to decode source video data in a first encoded data format. During video data processing operations, the source video data is evaluated to detect any change in the encoding format. Responsive to detecting a change in the source video data encoding, wherein the changed encoding is at least partially incompatible with the first encoded data format, the hardware accelerated video decoding operations are dynamically reconfigured to decode the source video data content based on the changed encoded data format

BRIEF DESCRIPTION OF THE DRAWINGS

In the Figures, the left-most digit of a component reference number identifies the particular Figure in which the component first appears.

DETAILED DESCRIPTION

Overview

Figure 1:
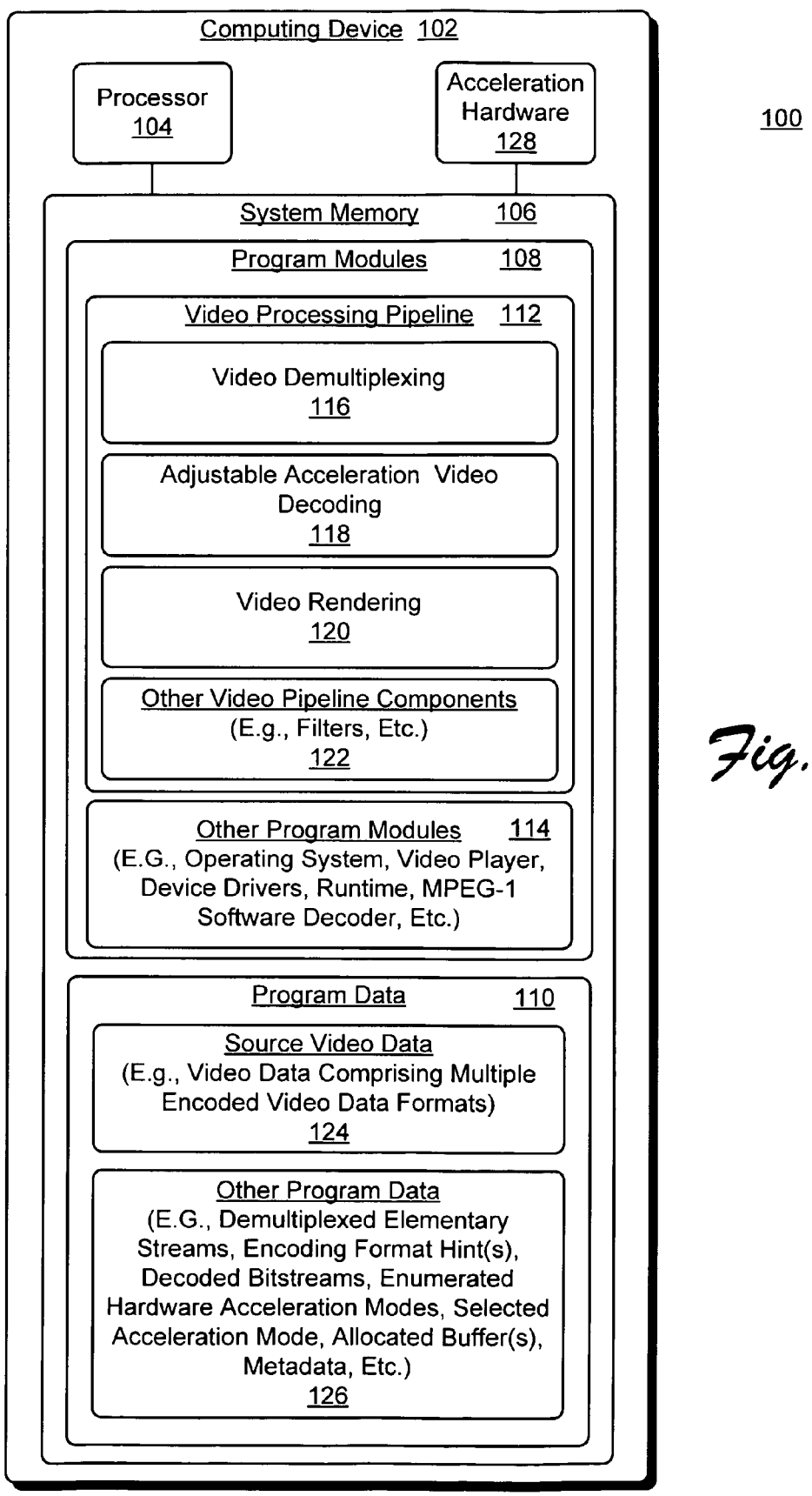
FIG. 1 illustrates an exemplary system for accelerating video data decoding, according to one embodiment.

MPEG-2 decoding operations typically include:

Bitstream parsing operations to parse incoming video stream variable length data ("VLD") decoding information. After the video data header has been parsed, these bitstream parsing operations may include Huffman decompression of the video data.

Motion compensation ('MoComp') operations to determine areas of an image to be combined to provide a basis for a next image Inverse Discrete Cosine transform (iDCT) operations to convert frequency based data to image data. This provides differences between the desired image and the image resulting from the motion compensation operations. It is synonymous to taking the motion compensated image and applying a 'correction' delta to generate the final desired image.

MPEG-2 decoding interfaces may leverage graphics acceleration hardware for off-host field VLD operations. Once a decoder negotiates a mode of operation with such graphics hardware to specify a level of hardware support, the negotiated level typically remains static for the entire video decoding session. This means that once support for hardware acceleration is established it cannot be disabled or changed during that session. One reason for this is because conventional decoding operations do not provide for hardware acceleration of MPEG-1 data decoding operations.

Systems (e.g., systems, apparatus, computer-readable media, etc.) and methods for accelerating video data decoding, which are described below in reference to FIGS. 1-4, address these problems with conventional video decoding pipelines. More particularly, the systems and methods provide a decoder that translates MPEG-1 data into an MPEG-2 compatible video data format. In one implementation, this is accomplished by dynamically dropping the hardware acceleration level of MPEG-2 decoding operations when MPEG-1 video data is encountered. This enables the decoder to leverage MPEG-2 decoding hardware and accelerate the MPEG-1 decoding (e.g., by performing an 'on the fly' translation of the MPEG1 data into a set of MPEG2 decode compatible data structures that can be leveraged by the MPEG2 hardware to perform acceleration). The systems and methods for accelerating video data decoding correctly maintain metadata about the Bitstream, and thereby enable other components in the video processing pipeline to correct/mitigate for any differences that could not be corrected for during MPEG-1 to MPEG-2 decoding operation translations.

These and other aspects of the systems and methods for accelerating video data decoding are now described in greater detail.

An Exemplary System

Although not required, the systems and methods for accelerating video data decoding are described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 1 shows an exemplary system 100 for accelerating video data decoding, according to one embodiment. System 100 includes computing device 102. Computing device 102 represents any type of computing device such as a personal computer, a laptop, a server, handheld or mobile computing device (e.g., a small form factor device), etc. Computing device 102 includes one or more processing units 104 coupled to system memory 106. System memory 106 includes computer-program modules ("program modules") 108 and program data 110. A processor 104 fetches and executes computer-program instructions from respective ones of the program modules 110. Program modules 110 include video processing pipeline modules 112 for accelerating video data decoding, and other program modules 114 such as an operating system, device drivers, a runtime, etc. More particularly, video processing pipeline modules 112 include, for example, variable acceleration adjustment video decoding module 116, video demultiplexing module 118, video rendering module 120, and other video pipeline processing modules 122 such as filters, etc.

Video demultiplexing model 116 demultiplexes input source video data 124 (e.g., MPEG-2 and/or MPEG-1 video data) into elementary streams of video content for decoding/translation into a decoded bitstream by adjustable video decoding module ("decoder") 118. For purposes of exemplary illustration, such elementary streams and decoded bitstreams are shown as respective portions of "other program data" 126. Decoder 118, with assistance of an off-host variable length decoding (VLD) configuration (i.e., acceleration hardware 128), translates the received elementary streams, which may be encoded with multiple different types of encoding algorithms (e.g., MPEG-2 and/or MPEG-1 algorithms), into a decoded bitstream for subsequent rendering/presentation to a user by video rendering module 120. For example, when source video data 124 is supplied by a DVD, source video data 124 is initially associated with a first encoded format (e.g., MPEG-2). However, the initial data format of source video data 124 may change to different data format (e.g., MPEG-1). Such data source format changes can occur an arbitrary number of times depending on how the input video data 124 is configured. Since techniques to decode different video data formats may not be compatible with one another, decoder 118 evaluates current decoding operations to determine if they should be dynamically reconfigured to substantially optimally decode the newly detected video data format.

In one implementation, a component (e.g., video demultiplexing module 116) of video processing pipeline 112 upstream of decoder 118 detects initial encoding data format of source video data 124 and any changes in the data format. The component communicates these indication(s) as an explicit encoding format hint to decoder 118. For purposes of exemplary illustration, such encoding format hints are shown as respective portions of "other data" 126. In another implementation, decoder 118 detects such source video data format changes. Techniques to detect data format(s) of source video data are known.

Responsive to identifying an initial video data format of input source video data 124, decoder 118 determines whether to use acceleration operations of graphics acceleration hardware 128. To this end, decoder 118 queries renderer 120. If video rendering model 120 agrees to use hardware acceleration, decoder 118 enumerates the hardware capabilities of graphics acceleration hardware 128 to determine the optimal acceleration mode (i.e., the desired level of acceleration) to use when translating source video data 124 into decoded bitstreams for rendering by renderer 120. For example, if the data format is MPEG-2, the decoder 118 configures decoding operations to leverage a hardware acceleration mode (e.g., one of modes A, B, etc.) that implements off-host VLD and resulting iDCT/MoComp operations. Decoder 118 notifies renderer 120 of the selected hardware acceleration mode. Next, decoder 118 and renderer 120 negotiate compressed and uncompressed buffer allocations based on the selected hardware acceleration mode, including format type (e.g., motion estimation buffers, DCT buffers, bitstream compressed buffers, etc.) and buffer counts. In this implementation, renderer 120 allocates the buffers for decoder 118.

At this point, decoder 118 begins translating elementary streams of source video data 124 into decoded bitstreams for rendering (i.e., playback) by video rendering module 120. During these translation operations, if decoder 118 detects a format change in demultiplexed elementary streams associated with the source video data 124, decoder 118 uses the existing hardware connection to determine capabilities of acceleration hardware 128 and the current hardware acceleration mode. Decoder 118 uses this information to determine if it is possible to translate the new data format associated with the source video data 124 without reconfiguring decoding parameters (e.g., the currently hardware acceleration mode, buffer types and counts, etc.). If so, decoding and rendering operations continue as described above.

However, it is not possible to substantially optimally translate the newly detected video data format using the current hardware acceleration mode, decoder 118 drops the currently selected hardware acceleration mode (i.e., disconnects a current connection between the decoder 118 and the renderer 120) and renegotiates video data decoding operations and parameters with the renderer 120 based on the newly detected video data format. For example, when elementary stream content (i.e., the multiplexed source video data 124) changes from MPEG-2 to MPEG-1 data format, decoder 118 reconfigures acceleration hardware 128 to implement a non-VLD configuration, or decoder 118 switches to full software MPEG-1 decoding operations. MPEG1 content contains many similarities to MPEG2. As a result, after decoder 118 has negotiated MoComp or iDCT/MoComp modes with renderer 120, decoder 118 can implement 'on the fly' translation of the MPEG1 data into MPEG2 data after the decoder has performed VLD software decoding stages. When decoder 118 has negotiated use of motion compensation only or motion compensation and iDCT with renderer 120, the transition is transparent to the video decoding hardware (i.e., acceleration hardware 128).

Decoder 118 takes differences between MPEG1 and MPEG-2 data into account when decoding MPEG-1 data to MPEG-2 data. For example, MPEG2 motion vectors are specified as being half pel offsets, whereas MPEG1 can use full pel deltas. To address this difference, decoder 118 doubles the motion vector values. Additionally, in MPEG1, slices are not required to start and end on a same horizontal row of macroblocks. It is possible that all macroblocks of a picture are in a single slice. In contrast, in MPEG2 a slice always starts and ends on a same horizontal row of macroblocks. To address these differences, decoder 118 breaks-up and translates the motion compensation vectors. Additionally, interpretation of the spatial location of the chroma data with respect to the luma data differs between MPEG-2 and MPEG-1. MPEG-2 assumes that chroma samples are vertically aligned with the luma samples, whereas MPEG-1 assumes that the chroma samples lie 'in the middle' of each 2×2 block of luma samples. To address this, decoder 118 passes the chroma subsampling semantic (e.g., YUV to RGB reconstruction information) along with an indication of the renegotiated source video data format to a filter downstream in the video processing pipeline 112 using color field extensions, for example, to a known video information header. Moreover, decoder 118 translates MPEG-1 D pictures into I frames. Such semantics and other types of metadata can be utilized, for example, by video renderer 120 to correct for any imperfections in the translations from a renegotiated source video data format to the decoded bitstream.

In one implementation, if hardware 128 does not support a non-VLD configuration to decode MPEG-1 content, decoder 118 implements, or otherwise accesses MPEG-1 software decoding operations to decode the content. Analogously, if source video data 124 changes from MPEG-1 content to MPEG-2 content, decoder 118 reconfigures decoding operations from MPEG-1 decoding to substantially optimally decode MPEG-2 data. For instance, when MPEG-2 decoding acceleration hardware 128 is present, decoder 118 returns to some combination of off-host hardware accelerated VLD MPEG-2 decoding, which in one implementation may include software implemented MPEG-2 decoding operations. Alternatively, decoder 118 implements all MPEG-2 specific software decoding operations. Additionally, as part of these reconfiguration operations, and as described above, decoder 118 negotiates these parameters and allocates compressed and uncompressed format type and buffer counts with renderer 120 before translating input source video data 124 according to the newly detected video data format into a decoded bitstream for rendering by renderer 120.

In view of the above, system 100 dynamically reconfigures source video data translation and rendering operations based on the particular encoding algorithm associated with the source video data being translated at that particular time for rendering.

An Exemplary Procedure

Figure 2:
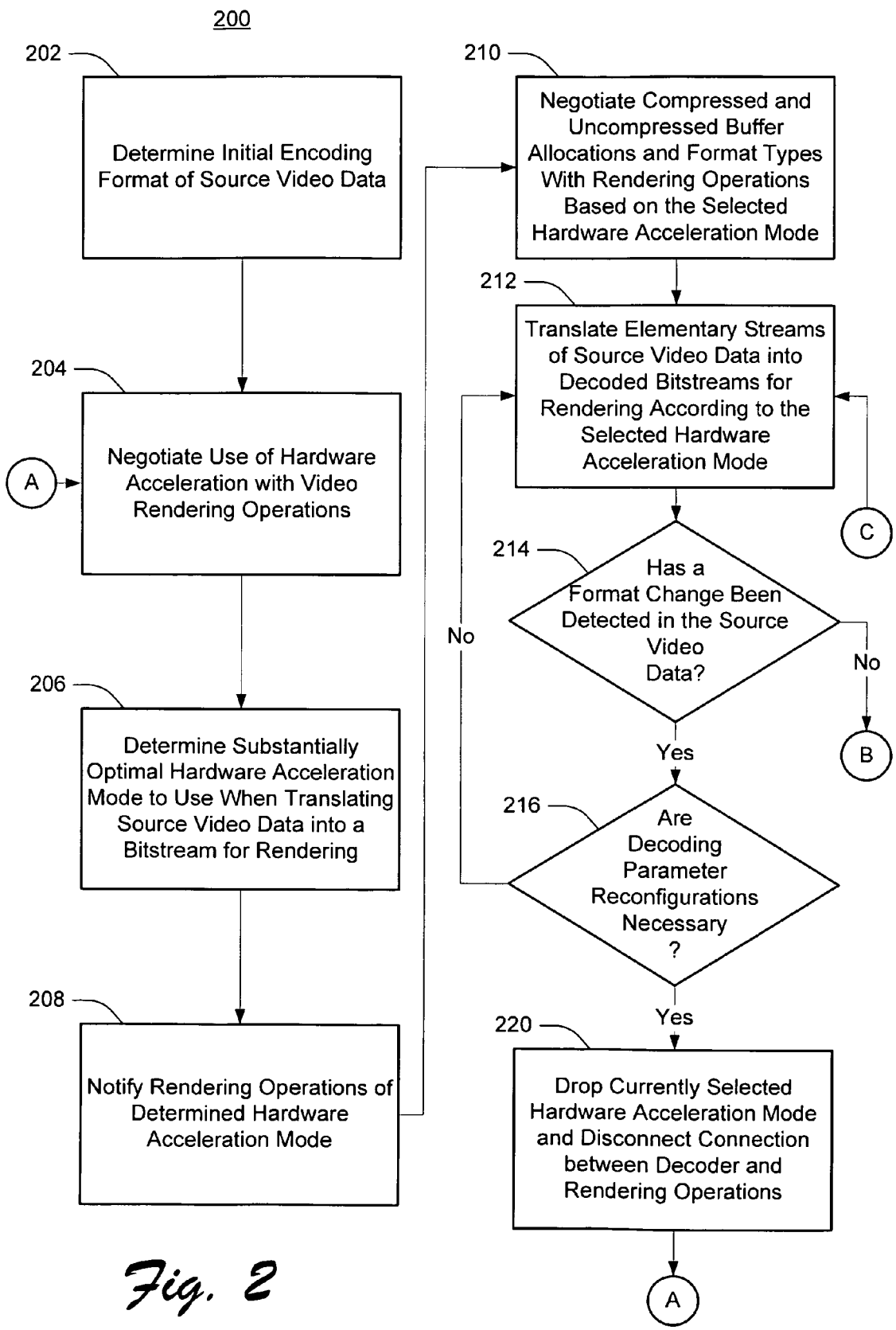
FIG. 2 shows an exemplary procedure for accelerating video data decoding, according to one embodiment.

FIG. 2 shows an exemplary procedure 200 for accelerating video data decoding, according to one embodiment. For purposes of exemplary description, the operations of procedure 200 are described with respect to components of system 100 of FIG. 1. The leftmost numeral of a component reference number indicates the particular figure where the component is first described.

At block 202, decoder 118 (FIG. 1) determines the initial encoding format of source video data 122. At block 204, decoder 108 negotiates use of hardware acceleration operations (implemented by acceleration hardware 128) with renderer 120. Assuming that renderer 120 desires translation operations to utilize hardware acceleration, at block 206, decoder 118 identifies a substantially optimal hardware acceleration mode to use when translating source video data 122 into a decoded bitstream for rendering. At block 208, decoder 118 notifies renderer 120 of the determined/selected hardware acceleration mode. At block 210, decoder 118 and renderer 120 negotiate compressed and uncompressed buffer allocation and format types based on the selected hardware acceleration mode. At block 212, decoder 118 translates the multiplexed source video data 122 (i.e., elementary streams) into decoded bitstreams for rendering by renderer 120. These translation operations are facilitated by the selected hardware acceleration mode.

At block 214, decoder 118 determines whether a format change has been detected with respect to the source video data 122. If so, operations continue at block 216, wherein decoder 118 determines whether decoding parameter reconfigurations are necessary to continue decoding the new data format associated with the source video data 122. Such parameters include the particular hardware acceleration mode currently being utilized into the negotiated compressed and uncompressed buffer allocations and format types. If decoding parameter reconfigurations are not necessary, operations of procedure 200 continue at block 212 as discussed above. However, if such reconfiguration is desired, operations continue at block 220, where decoder 118 drops the currently selected hardware acceleration mode and disconnects the connection between the decoder 118 and the renderer 120. At this point, operations of procedure 204 continue at block 202 as described above, wherein a substantially optimal hardware acceleration mode to translate the newly detected source video data format is determined and negotiated with renderer 120.

Figure 3:
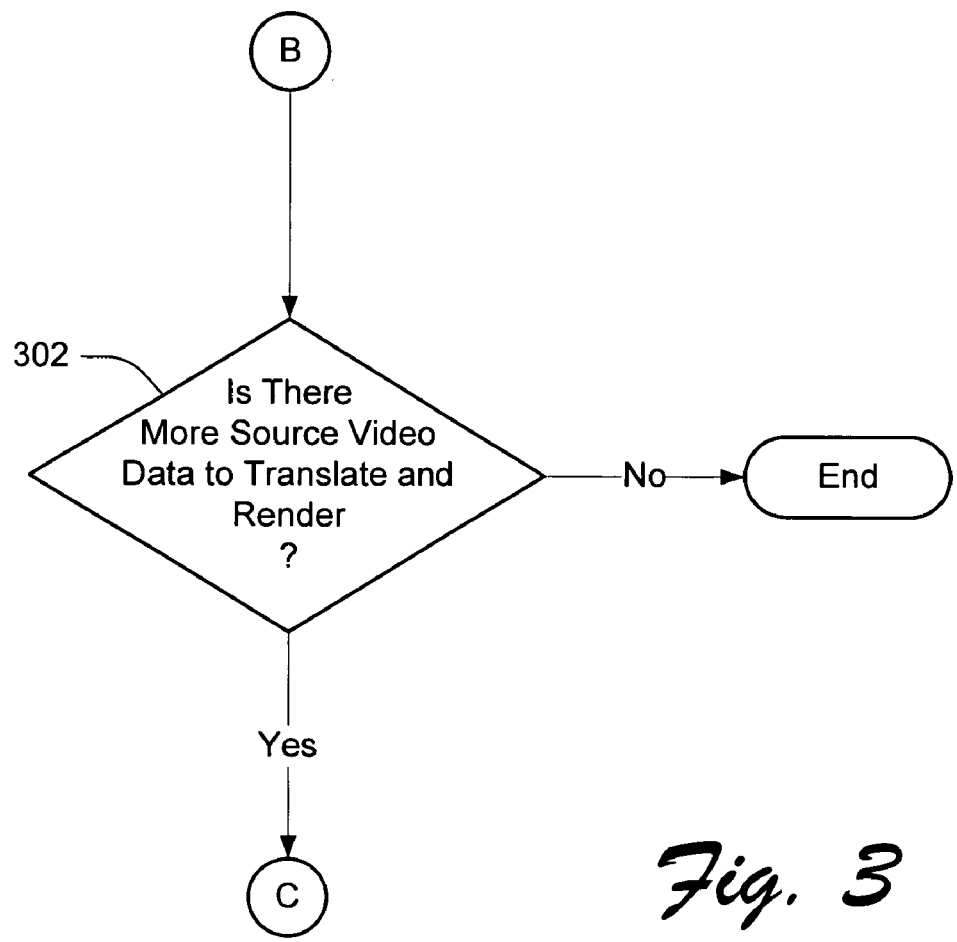
FIG. 3 shows additional aspects of the exemplary procedure of FIG. 2 for accelerating video data decoding, according to one embodiment.

Referring to block 214, if it was determined that there was no format change detected in the source video data 122, operations continue at block 302 of FIG. 3, as shown by on page reference "B".

FIG. 3 shows further aspects of the exemplary procedure of FIG. 2 for accelerating video data decoding, according to one embodiment. At block 302, the procedure determines whether there is more source video data 122 (FIG. 1) to translate and render. If not, the procedure 200 ends. Otherwise, the procedure continues at block 212 of FIG. 2, as shown by on page reference "C".

An Exemplary Operating Environment

Figure 4:
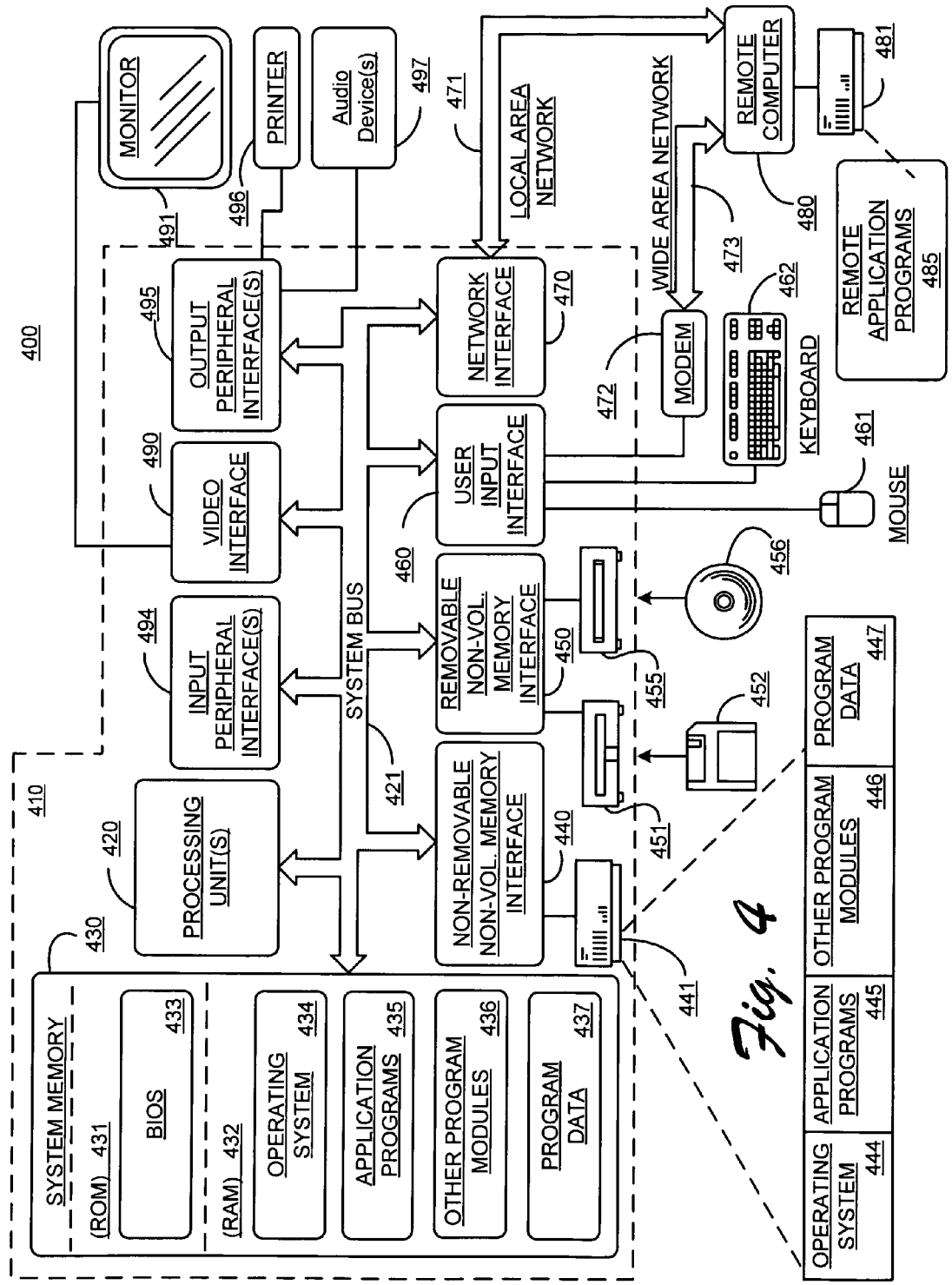
FIG. 4 illustrates an example of a suitable computing environment in which accelerating video data decoding may be fully or partially implemented.

FIG. 4 illustrates an example of a suitable computing environment in which accelerating video data decoding may be fully or partially implemented. Exemplary computing environment 400 is only one example of a suitable computing environment for the exemplary system of FIG. 1 and exemplary operations of FIGS. 2 and 3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention can be practiced in a distributed computing environment where tasks are performed by remote processing devices that are linked through a communications network. In a distributed computing environment, program modules may be located in both local and remote memory storage devices.

With reference to FIG. 4, an exemplary system for accelerating video data decoding includes a general purpose computing device in the form of a computer 410 implementing, for example, system 100 of FIG. 1. The following described aspects of computer 410 are exemplary implementations of computing device 102 of FIG. 1. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 433, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 431 that reads from or writes to a removable, nonvolatile magnetic disk 432, and an optical disk drive 433 that reads from or writes to a removable, nonvolatile optical disk 436 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 431 and optical disk drive 433 are typically connected to the system bus 421 by a removable memory interface, such as interface 430.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 443, other program modules 446, and program data 447. Note that these components can either be the same as or different from operating system 434, application programs 433, other program modules 436, and program data 437. Application programs 433 includes, for example program modules 108 of FIG. 1. Program data 437 includes, for example, program data 110 of FIG. 1. Operating system 444, application programs 443, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. In addition to the monitor, computers may also include other peripheral output devices such as printer 496 and audio device(s) 497, which may be connected through an output peripheral interface 493.

The computer 410 may operate in a networked environment using logical connections to one or more remote computers, such as a remote computer 480. In one implementation, remote computer 480 represents computing device 102 or networked computer 104 of FIG. 1. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 483 as residing on memory device 481. The network connections shown are exemplary and other means of establishing a communications link between the computers may be used.

CONCLUSION

Although the systems and methods for accelerating video data decoding have been described in language specific to structural features and/or methodological operations or actions, it is understood that the implementations defined in the appended claims are not necessarily limited to the specific features or actions described. Rather, the specific features and operations of system 100 are disclosed as exemplary forms of implementing the claimed subject matter.

The invention claimed is:

1. A computer-implemented method comprising:
under control of one or more processors configured with executable instructions:
configuring hardware accelerated video decoding operations to decode source video data in a first encoded data format;
detecting a change in encoding format associated with the source video data content during decoding the source data, the change indicating that the source video data content is encoded in a second encoded data format that is at least partially incompatible with the first encoded data format; and
dynamically reconfiguring the hardware accelerated video decoding operations to decode the source video data content in the second encoded data format.

2. The method of claim 1, wherein the first encoded data format is MPEG-2 and wherein the second encoded data format is MPEG-1, or wherein the first encoded data format is MPEG-1 and wherein the second encoded data format is MPEG-2.

3. The method of claim 1, wherein detecting the change in the encoding format further comprises detecting the change, by demultiplexing operations to demultiplex the source video data into elementary streams for decoding.

4. The method of claim 1, wherein detecting the change in the encoding format further comprises detecting the change, by decoding operations to translate demultiplexed elementary streams associated with the source video data into a decoded bitstream for rendering.

5. The method of claim 1, further comprising:
responsive to detecting the change in the encoding format:
determining that the hardware accelerated video decoding operations do not need to be reconfigured to substantially optimally decode the source video data; and
responsive to the determining, skipping operations associated with the dynamically reconfiguring.

6. The method of claim 1, wherein dynamically reconfiguring the hardware accelerated video decoding operations further comprises:
determining a substantially optimal hardware acceleration mode to translate the source video data into a decoded bitstream for rendering; and
negotiating compressed and uncompressed buffer allocations and format types with rendering operations based on the substantially optimal hardware acceleration mode.

7. The method of claim 6, wherein dynamically reconfiguring the hardware accelerated video decoding operations further comprises:
enumerating hardware capabilities associated with video data decoding acceleration hardware; and
evaluating respective ones of enumerated hardware capabilities to determine the substantially optimal hardware acceleration mode.

8. A memory storing computer-program instructions executable by a processor for:
determining an initial encoded data format associated with source video data;
negotiating a hardware acceleration mode with rendering operations in a video data processing pipeline;
decoding the source video data to generate a decoded bitstream, the decoding being based on the hardware acceleration mode;
detecting, during operations in the video data processing pipeline, that the initial encoded data format has changed to a different encoded data format; and
determining whether operations to decode the source video data based on the different encoded data format are sufficient to properly decode the source video data.

9. The memory of claim 8, wherein the computer-program instructions for detecting are performed by demultiplexer or decoder operations in the video data processing pipeline.

10. The memory of claim 8, further comprising computer-program instructions for:
detecting that the operations to decode the source video data in the different encoded data format are not sufficient to properly decode the source video data; and
responsive to the evaluating, reconfiguring the hardware acceleration mode with the rendering operations to decode the source video data based on the different encoded data format.

11. The memory of claim 10, further comprising computer-program instructions for negotiating, by decoding operations, allocation of buffers and buffer types with the rendering operations based on a newly selected hardware acceleration mode.

12. The memory of claim 10, wherein the computer-program instructions for evaluating further comprises instructions for:
enumerating hardware capabilities associated with video data decoding acceleration hardware;
evaluating respective ones of enumerated hardware capabilities to determine a substantially optimal hardware acceleration mode to decode the source video data;
wherein the reconfiguring, the hardware acceleration mode is reconfigured to the substantially optimal hardware acceleration mode; and
decoding the source video data using to substantially optimal hardware acceleration mode to generate the decoded bitstream.

13. The memory of claim 10, wherein the computer-program instructions further comprises instructions for:
maintaining metadata about the decoded bitstream, the metadata pertaining to an aspect that could not be corrected during translation of the source video data content in the initial or the different encoded data format into the decoded bitstream;
distributing, by a decoder, the decoded bitstream and the metadata to a different component in a video processing pipeline; and
wherein the metadata allows the different component to mitigate the aspect.

14. The memory of claim 10, wherein if the different encoded data format is MPEG-1, decoding further comprises:
translating a portion of the source video data into MPEG-2 compatible decode commands;
converting a remainder of the source video data into chroma information for rendering operations; and
distributing the MPEG-2 compatible decode commands and the chroma information to a different component of the video data processing pipeline.

15. A computing device comprising:
a processor; and
a memory coupled to the processor, the memory comprising computer-program instructions executable by the processor for:
negotiating a hardware acceleration mode with rendering operations in a video data processing pipeline, the negotiating being based on an initial encoded data format;

decoding the source video data based on the hardware acceleration mode;

detecting, during operations in the video data processing pipeline, that the initial encoded data format has changed to a different encoded data format;

determining whether operations to decode the source video data based on the different encoded data format are sufficient to properly decode the source video data; and if operations to decode the source video data are not adequate in view of a baseline quality criteria that video playback operations of decoded bitstream data should not result in erroneous playback, reconfiguring the hardware acceleration mode with the rendering operations based on the different encoded data format.

16. The computing device of claim 15, wherein the initial encoded data format is MPEG-2 and wherein the different encoded data format is MPEG-1, or wherein the initial encoded data format is MPEG-1 and wherein the different encoded data format is MPEG-2.

17. The computing device of claim 15, wherein detecting is performed by demultiplexer or decoder operations in the video data processing pipeline.

18. The computing device of claim 15, further comprising negotiating, by decoding operations, allocation of buffers and buffer types with rendering operations based on a newly selected hardware acceleration mode.

19. The computing device of claim 15, wherein determining further comprises:

enumerating hardware capabilities associated with video data decoding acceleration hardware;

evaluating respective ones of enumerated hardware capabilities to determine a substantially optimal hardware acceleration mode to decode the source video data; and where in the reconfiguring, the hardware acceleration mode is reconfigured to the substantially optimal hardware acceleration mode.

20. The computing device of claim 15, wherein the computer-program instructions further comprises instructions for:

maintaining metadata about the bitstream, the metadata pertaining to an aspect that could not be corrected during translation of the source video data content in the first or the second encoded data format into the bitstream;

passing, by a decoder, the metadata to a different component in a video processing pipeline; and wherein the metadata allows the different component correct for an imperfect translation.

* * * * *